(12) United States Patent
Blake et al.

(10) Patent No.: US 11,879,397 B2
(45) Date of Patent: Jan. 23, 2024

(54) GAS TURBINE ENGINE WITH STAGGERED EPICYCLIC GEARBOX

(71) Applicant: ROLLS-ROYCE DEUTSCHLAND LTD & CO KG, Blankenfelde-Mahlow (DE)

(72) Inventors: Greg Blake, Berlin (DE); Hannes Wüstenberg, Berlin (DE); Johannes Scobel, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 17/789,971

(22) PCT Filed: Jan. 12, 2021

(86) PCT No.: PCT/EP2021/050448
§ 371 (c)(1),
(2) Date: Jun. 29, 2022

(87) PCT Pub. No.: WO2021/148276
PCT Pub. Date: Jul. 29, 2021

(65) Prior Publication Data
US 2023/0035008 A1    Feb. 2, 2023

(30) Foreign Application Priority Data
Jan. 22, 2020   (DE) .................... 10 2020 200 714.4

(51) Int. Cl.
*F02C 7/36*    (2006.01)
*F16H 1/28*    (2006.01)
(Continued)

(52) U.S. Cl.
CPC .................. *F02C 7/36* (2013.01); *F16H 1/28* (2013.01); *F16H 57/04* (2013.01); *F16H 57/08* (2013.01);
(Continued)

(58) Field of Classification Search
CPC ... F02C 7/36; F16H 1/28; F16H 57/04; F16H 57/08; F16H 57/082; F16H 2001/2881;
(Continued)

(56) References Cited

U.S. PATENT DOCUMENTS

2009/0090096 A1* 4/2009 Sheridan ................... F02C 7/36
60/226.3
2013/0192264 A1* 8/2013 McCune ................... F02K 3/06
74/395
(Continued)

FOREIGN PATENT DOCUMENTS

DE       3943104 A1    7/1990
DE    102017120219 A1    3/2019
(Continued)

OTHER PUBLICATIONS

German Search Report dated Sep. 1, 2020 from counterpart German Patent Application No. 10 2020 200 714.1.
(Continued)

*Primary Examiner* — Brandon D Lee
(74) *Attorney, Agent, or Firm* — SHUTTLEWORTH & INGERSOLL, PLC; Timothy J. Klima (57) ABSTRACT

Embodiments of the invention are shown in the figures, where a gas turbine engine for an aircraft includes: an engine core including a turbine, a compressor, and a core shaft connecting the turbine to the compressor; a fan including a plurality of fan blades; and a gearbox that receives an input from the core shaft and outputs drive to the fan so as to drive the fan about a rotational axis at a lower rotational speed
(Continued)

than the core shaft, wherein the gearbox is an epicyclic gearbox with a plurality of planet gears arranged in first and second sets of planet gears, the planet gears of the first set being positioned displaced relative to the planet gears of the second set in a direction parallel to the rotational axis.

19 Claims, 7 Drawing Sheets

(51) Int. Cl.
*F16H 57/04* (2010.01)
*F16H 57/08* (2006.01)

(52) U.S. Cl.
CPC ............... *F05D 2220/323* (2013.01); *F05D 2260/40311* (2013.01)

(58) Field of Classification Search
CPC ......... F16H 2001/289; F05D 2220/323; F05D 2260/40311; F05D 2250/312; Y02T 50/60
See application file for complete search history.

(56) References Cited

U.S. PATENT DOCUMENTS

| 2018/0230902 A1* | 8/2018 | Desjardins | ............... F02C 7/36 |
| 2019/0242301 A1 | 8/2019 | McCune et al. | |

FOREIGN PATENT DOCUMENTS

| EP | 2055986 A2 | 5/2009 |
| EP | 2789875 A2 | 10/2014 |
| EP | 3361122 A1 | 8/2018 |

OTHER PUBLICATIONS

International Search Report and Written Opinon dated Jun. 2, 2021 from counterpart International Patent Application No. PCT/EP2021/050448.

* cited by examiner

GAS TURBINE ENGINE WITH STAGGERED EPICYCLIC GEARBOX

This application is the National Phase of International Application PCT/EP2021/050448 filed Jan. 12, 2021 which designated the U.S.

This application claims priority to German Patent Application No. 102020200714.4 filed Jan. 22, 2020, which application is incorporated by reference herein.

The present disclosure relates to a gas turbine engine for an aircraft.

Gas turbine engines comprising a fan, often also referred to as turbofan engines, commonly generate a large fraction of the overall thrust by accelerating air by means of the fan. To further increase the amount of air accelerated by the fan, an approach is to increase the diameter of the fan. However, increasing the diameter while maintaining the speed of the fan may result in a too high speed of tips of blades of the fan. Propulsive fans have an optimum rotational speed, so an increase of the diameter may lead to an optimum fan speed that differs from the optimum engine shaft speed.

To overcome such limitations, a geared turbofan design can be applied. By interposing a gearbox between a driving shaft of the engine and the fan, the fan may be provided with an increased diameter and be rotated at its optimum speed, while at the same time rotating the engine shaft at a different rotational speed.

However, with increasing fan diameter, also the torques to be transmitted by the gearbox are likely to be increased. This, in turn, leads to an increased size of the gearbox which impedes on the surrounding air flow path.

It is an object to provide an improved gas turbine engine.

According to an aspect there is provided a gas turbine engine for an aircraft, comprising an engine core, a fan, and a gearbox. The engine core includes a turbine, a compressor, and a core shaft, wherein the core shaft connects the turbine to the compressor so as to transmit torque from the turbine to the compressor. The fan (is located upstream of the engine core and) comprises a plurality of fan blades. The gearbox receives an input from the core shaft and outputs drive to the fan so as to drive the fan about a rotational axis (e.g., relative to a structure and/or nacelle of the gas turbine engine) at a lower rotational speed than the core shaft. It is provided that the gearbox is an epicyclic gearbox and comprises a plurality of planet gears. The planet gears are arranged in (at least) first and second sets (e.g., rows) of planet gears (or more than two sets of planet gears). The planet gears of the first set are positioned displaced with respect to the planet gears of the second set in a direction parallel to the rotational axis.

In this way, a staggered arrangement of planet gears is provided. As a result of the arrangement of planet gears in two displaced sets, it is possible to use a larger number of planet gears and/or larger planet gears, and thereby to increase the torque that may be transmitted by the gearbox while maintaining a small gearbox diameter. Therefore, it is possible to transmit large torques without impeding a surrounding air flow path.

The gearbox further includes a sun gear and a ring gear, wherein each of the planet gears is in meshing connection with the sun gear and the ring gear.

The planet gears of the first set can particularly be arranged to rotate in a first plane, while the planet gears of the second set are arranged to rotate in a second plane, wherein the first plane is parallel to the second plane and is displaced relative to the second plane in a direction parallel to the rotational axis. For example, all planet gears are mounted so as to be rotatable about parallel axes. The planet gears of the first set may be arranged within a first cylindrical volume and the planet gears of the second set may be arranged within a second cylindrical volume, wherein the first and second cylindrical volumes do not intersect one another.

According to an embodiment, planet gears of the first and second sets overlap one another, in particular in the circumferential direction (and/or in the axial direction). By this, a large number of planet gears may be arranged in a comparably small volume. In particular, a larger number of planet gears may be arranged in this way compared to an arrangement with all planet gears in one plane.

More particularly, side faces of planet gears of the first set may face side faces of planet gears of the second set. Each of the planet gears comprises an outer ring of teeth between two side faces. For example, the planet gears of the first set are correspondingly axially offset relative to the planet gears of the second set.

Each planet gear may be mounted by means of a pin. The pin of a planet gear of one of the first and second sets may extend between adjacent planet gears of the other one of the first and second sets. That is, within one plane that is orthogonal to the rotational axis, planet gears of one set alternate with pins of the other set along the circumferential direction.

The core shaft is arranged to rotate coaxially with the rotational axis for a simple and robust arrangement.

According to an embodiment, a planet carrier carries the planet gears of the first and second sets. All planet gears of the gearbox may be rotatably mounted on the same common planet carrier.

Optionally, the planet carrier comprises a first portion and a second portion, wherein the planet gears of the first and second sets are arranged between the first and second portions. This allows for a particularly secure mounting of the planet gears and little deflections even when transmitting large torques. Alternatively, the planet carrier comprises only one portion on one side of the planet gears.

According to an example, the fan is fixedly connected to the planet carrier via one or more linkages. Correspondingly, the planet carrier drives the fan. This allows the ring gear to be fixedly mounted to a structure of the gas turbine engine.

According to an embodiment, the core shaft is arranged to simultaneously rotate in the same rotational direction as the one or more linkages.

Optionally, one or more (e.g., all) of the planet gears are rotatably mounted on the respective pins by means of a bearing, the pins being fixed to the planet carrier. Alternatively or in addition one or more (e.g., all) of the planet gears are fixed to the respective pins (e.g., fixedly mounted thereon or integrally formed therewith), the pins being rotatably mounted on the planet carrier by means of a bearing.

Optionally, each planet gear of the first set comprises a first ring of teeth and each planet gear of the second set comprises a second ring of teeth, wherein the first ring of teeth has an opposite helicity compared to the second ring of teeth. This can allow to axially secure the gearbox and to reduce noise. Alternatively, the teeth of the first and second rings of teeth may be straight and parallel to the axis of rotation of the corresponding planet gear. This allows a so-called floating sun gear that is allowed to axially move to compensate for temperature-induced expansion and/or vibrations.

According to an embodiment, the first set comprises the same number of planet gears as the second set.

As an example, the first set and/or the second set may (each) comprise four planet gears. This may allow a highly efficient circumferential coverage. In general, each set may comprise at least three planet gears for a high radial stability.

Optionally, a common oil system provides oil both to the engine core and to the gearbox. This allows a simplified setup of the gas turbine engine.

Optionally, the turbine is a first turbine, the compressor is a first compressor, and the core shaft is a first core shaft, wherein the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure relates to a gas turbine engine. Such a gas turbine engine may comprise an engine core comprising a turbine, a combustor, a compressor, and a core shaft operatively connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
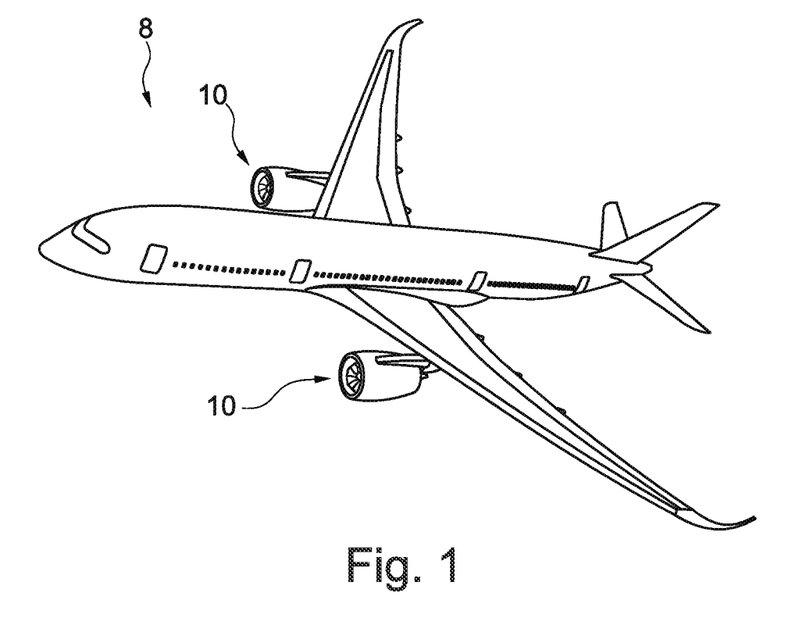
FIG. 1 is a perspective view of an aircraft having a plurality of gas turbine engines.

FIG. 1 shows an aircraft 8 in the form of a passenger aircraft. Aircraft 8 comprises several (here two) gas turbine engines 10. In the example shown in FIG. 1, the gas turbine engines 10 are mounted to wings of the aircraft 8. The aircraft 8 wings are fixed to a fuselage of the aircraft 8. Alternatively or in addition, one or more gas turbine engines 10 may be directly mounted to the aircraft body.

Figure 2:
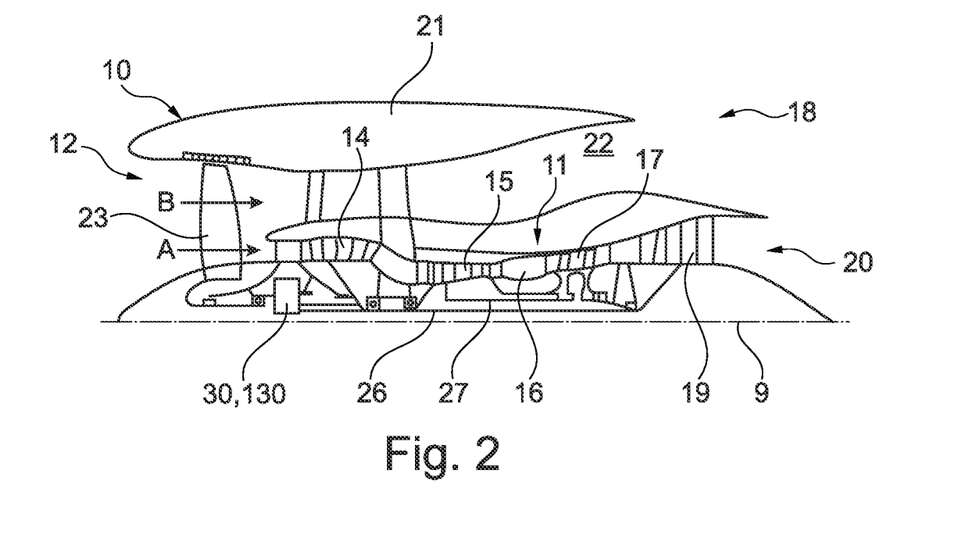
FIG. 2 is a sectional side view of a gas turbine engine.

FIG. 2 illustrates one of the gas turbine engines 10 of the aircraft 8. The gas turbine engine 10 has a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a (core) shaft 26 (low-pressure shaft) and an epicyclic gearbox 30; 130.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting (core) shaft 27 (high-pressure shaft). The fan 23 generally provides the majority of the propulsive thrust. The epicyclic gearbox 30; 130 is a reduction gearbox. Each of the core airflow A and the bypass airflow B flows through an annular channel that surrounds the gearbox 30; 130. The gearbox is integrated between the fan 23 and the engine core 11.

Figure 3:
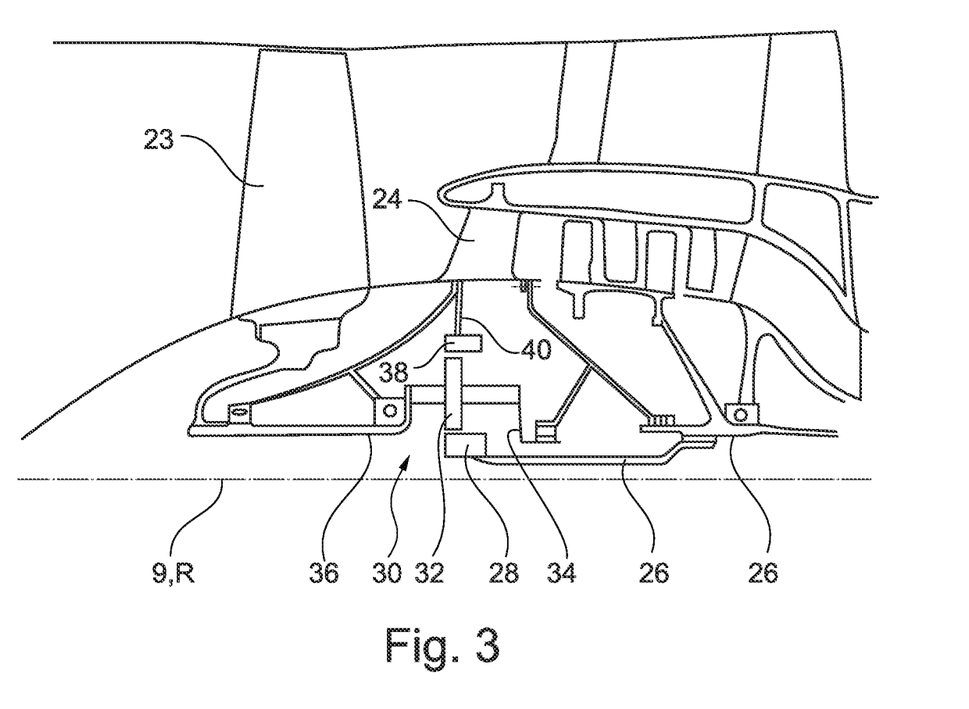
FIG. 3 is a close up sectional side view of an upstream portion of a gas turbine engine.

An exemplary arrangement for the geared fan gas turbine engine 10 is shown in FIG. 3. The low pressure turbine 19 (see FIG. 2) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The planet gears 32 are disposed in a staggered arrangement as will be described in greater detail below. By the arrangement of the gearbox 30 a maneuver loads reaction path (at least partially) flows through the gearbox 30 and into the engine structure and then into an airframe of the gas turbine engine 10.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 4:
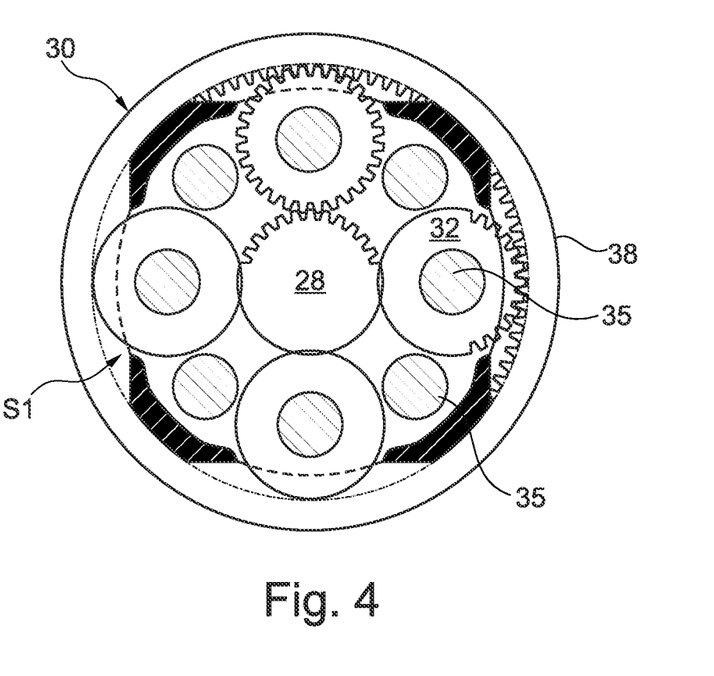
FIG. 4 is a partially cut-away view of a gearbox for a gas turbine engine.

The epicyclic gearbox 30 is shown by way of example in greater detail in FIG. 4. Each of the sun gear 28, planet gears 32 and ring gear 38 comprise teeth about their periphery to intermesh with the other gears. However, for clarity only exemplary portions of the teeth are illustrated in FIG. 4. There are four planet gears 32 of a first set S1 of planet gears 32 illustrated, although it will be apparent to the skilled reader that more or fewer planet gears 32 may be provided within the scope of the claimed invention. For example, the first set S1 of the (planetary) epicyclic gearbox 30 comprises at least three planet gears 32. The planet gears 32 of the first set S1 are arranged in a first plane. The gearbox 30 further comprises a second set S2 of planet gears 32. The planet gears 32 of the second set S2 are arranged in a second plane that is not shown in the view of FIG. 4.

Each planet gear 32 is rotatably mounted on the planet carrier 34 (see, e.g., FIG. 3) by means of a pin 35. For example, each planet gear 32 is rotatable with respect to the corresponding pin 35. The pin 35 may then be fixed relative to the planet carrier 34. As another alternative, each of the planet gears 32 may be fixed with respect to the corresponding pin 35, while the pins 35 are rotatably mounted on the planet carrier 34. FIG. 4 shows the pins 35 of the planet gears 32 of the first set S1, as well as the pins 35 of the planet gears 32 of the second set S2 (while the planet gears 32 of the second set S2 themselves are not visible in the view of FIG. 4).

The epicyclic gearbox 30 illustrated by way of example in FIGS. 3 and 4 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility, but may particularly be stiff. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. In particular, however, it may be provided that the shaft 26 (at least its part adjacent the gearbox 30) and/or the linkages 36 is/are stiff, in particular such that during normal use, no movement of parts of the shaft relative to the gearbox are allowed. For example, where the gearbox 30 has a star arrangement (described above), the skilled person would readily understand that the arrangement of output and support linkages and bearing locations would typically be different to that shown by way of example in FIG. 3.

Accordingly, the present disclosure extends to a gas turbine engine having any arrangement of gearbox styles (for example star or planetary), support structures, input and output shaft arrangement, and bearing locations.

Optionally, the gearbox may drive additional components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 2 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 2), and a circumferential direction (perpendicular to the page in the FIG. 2 view). The axial, radial and circumferential directions are mutually perpendicular.

Figure 5:
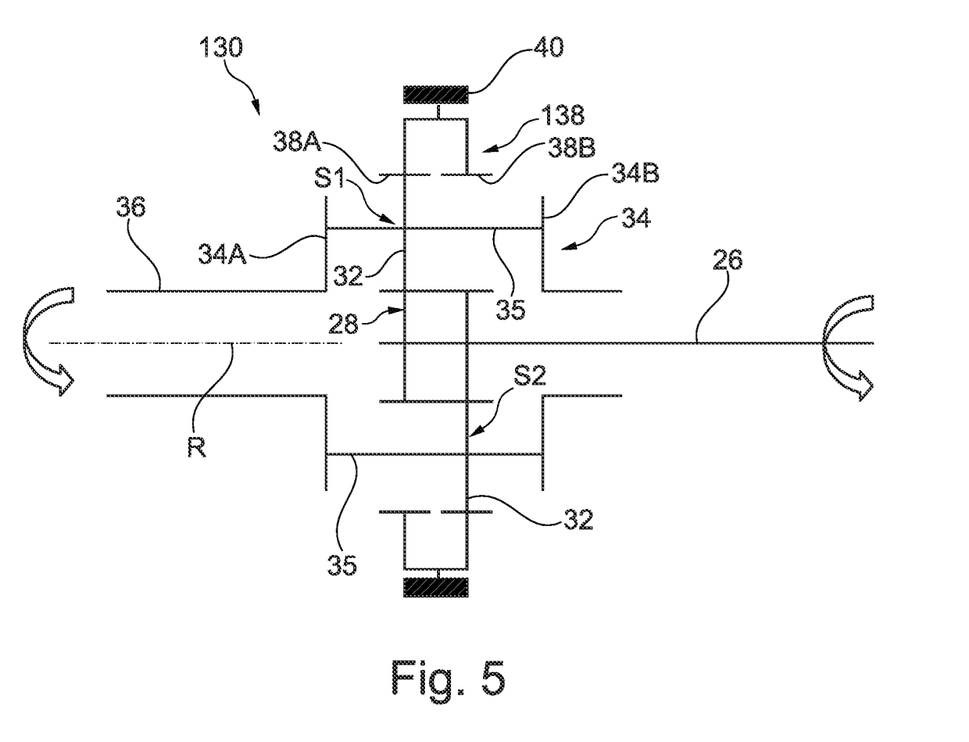
FIG. 5 is a side view of a schematic illustration of a gearbox for the gas turbine engine according to FIGS. 2 and 3.
Figure 6:
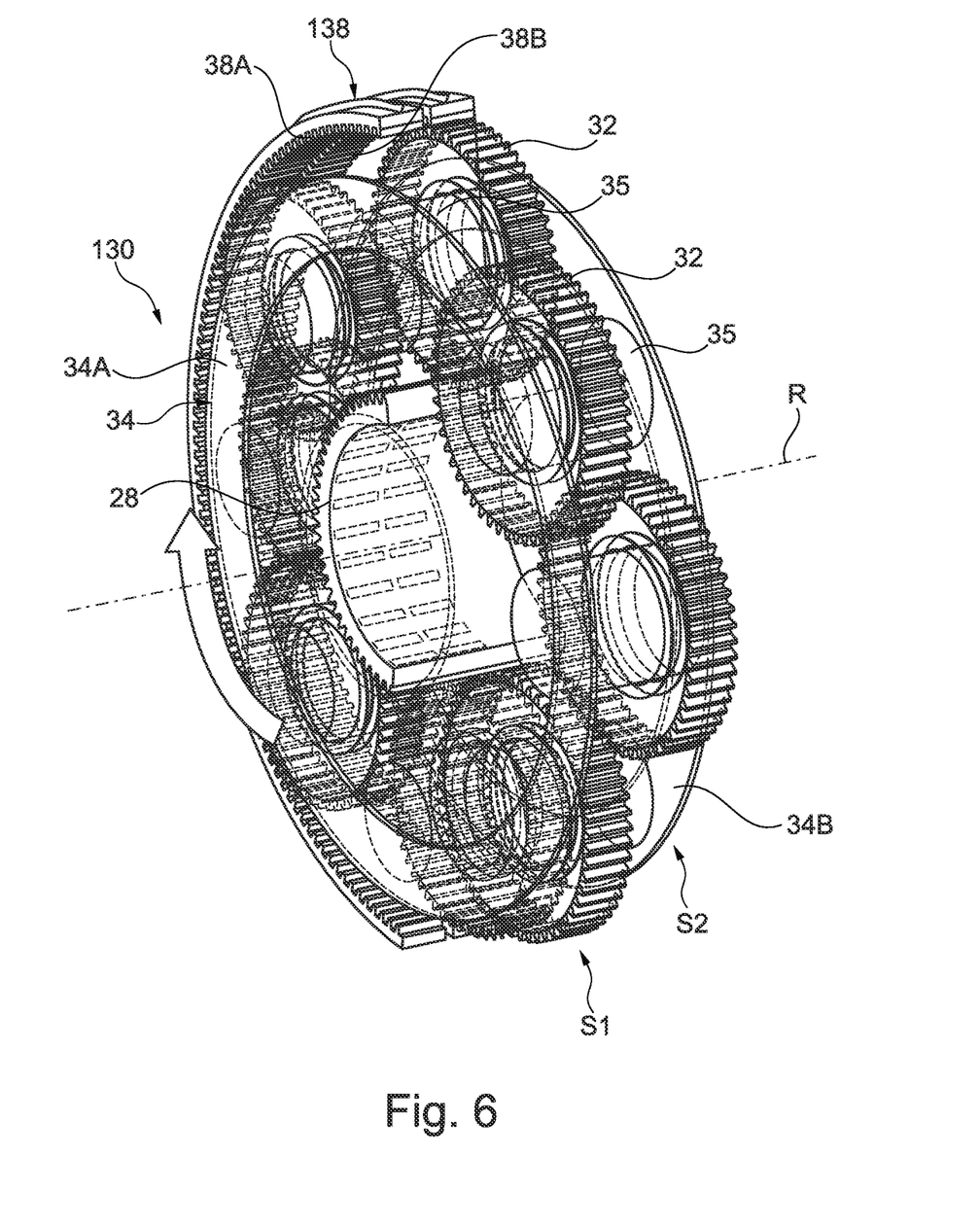
FIG. 6 is a perspective view of the gearbox of FIG. 5.

FIGS. 5 and 6 show a gearbox 130 for the gas turbine engine 10 described above. The gearbox 130 according to FIGS. 5 and 6 is similar to the gearbox 30 described with reference to FIGS. 3 and 4, in that it is an epicyclic gearbox 130, wherein the sun gear 28 is fixed to the shaft 26 and the planet carrier 34 is fixed with respect to the fan 23 by means of the linkages 36, while a ring gear 138 is fixed relative to the engine structure via linkages 40. Also the gearbox 130 of FIG. 5 has a first set S1 and a second set S2 of planet gears 32. The planet gears 32 of the first set S1 are arranged in a first plane and the planet gears 32 of the second set S2 are arranged in a second plane, wherein the first plane and the second plane are displaced relative to one another. To be more precise, according to FIGS. 5 and 6, the first plane and the second plane are parallel to one another and orthogonal to the axis of rotation R of the fan 23. The axis of rotation R of the fan 23 corresponds to the rotational axis of the linkages 36 and the planet carrier 34. Furthermore, the axis of rotation R is coaxial with the principle rotational axis 9. A rotation of the shaft 26 around the principle rotational axis 9 in a given direction leads to a rotation of the fan 23 in the same rotational direction. The first plane and the second plane are offset relative to one another in the direction of the axis of rotation R.

The ring gear 138 comprises first and second rings of teeth 38A, 38B. The first ring of teeth 38A meshes with the planet gears 32 of the first set S1 (but not with the planet gears 32 of the second set S2). The second ring of teeth 38B meshes with the planet gears 32 of the second set S2 (but not with the planet gears 32 of the first set S1). In the present example, a gap is formed between the first and second rings of teeth 38A, 38B of the ring gear 38. Alternatively, the ring gear 38 could comprise only one (continuous) ring of teeth for the planet gears 32 of all sets S1, S2. This is the case at the gearbox 30 of FIGS. 3 and 4.

The sun gear 28 comprises only one (continuous in axial direction) ring of teeth for the planet gears 32 of all sets S1, S2. Alternatively, the sun gear 28 could comprise first and second rings of teeth, wherein the first ring of teeth could mesh with the planet gears 32 of the first set S1 (but not with the planet gears 32 of the second set S2) and the second ring of teeth could mesh with the planet gears 32 of the second set S2 (but not with the planet gears 32 of the first set S1).

The planet carrier 34 comprises a first portion 34A and a second portion 34B. Each planet gear 32 pin 35 is mounted on the first portion 34A as well as on the second portion 34B. The planet gears 32 of both sets S1, S2 are arranged between the first and second portions 34A, 34B of the planet carrier 34. A portion (the first portion 34A) of the planet carrier 34 is fixed to the linkages 36. In the present example, a portion (the second portion 34B) of the planet carrier 34 surrounds the shaft 26.

Each planet gear 32 according to FIGS. 5 and 6 is rotatably supported on the corresponding pin 35 by means of a roller bearing or a journal bearing. The pins 35 are stiff (and not flexible). The use of a planet carrier 34 with two portions 34A, 34B allows to further increase the stiffness and to avoid deflections of the pins 35.

As can be seen in FIG. 6, the planet gears 32 of the first and second sets S1, S2 overlap one another so that parts of side faces of the planet gears 32 face one another. The number of planet gears 32 (eight in the example of FIGS. 5 and 6) of the first and second sets S1, S2 would not fit into one plane between the sun gear 28 and the ring gear 138. Therefore, without an increase of the diameter of the gearbox 130 (the same holds for the gearbox 30 according to FIGS. 3 and 4), a larger number of planet gears 32 can be used and, therefore, a higher torque can be transmitted by means of the gearbox 130.

The teeth of the gears of the gearboxes 30, 130 according to FIGS. 3 and 4, and 5 and 6, respectively, extend parallel to the axis of rotation R. However, alternatively, the teeth may be set at an angle with respect to the axis of rotation R.

It is worth noting that the rotational axis of each planet gear 32 (of each set S1, S2) are parallel to one another. Further, these rotational axes are all parallel to the rotational axis of the sun gear 28. Each planet gear 32 (of each set S1, S2) is in meshing engagement with the sun gear 28 and with the ring gear 138.

The staggered epicyclic arrangement allows for an increase of torque splitting (for power density) without an increased diametral space claim. The more planet gears 32, the more the torque can be split and thus each element can be smaller in diameter. In addition, the staggered arrangement allows a relatively small diameter of the gearbox, what helps to reduce centrifugal forces on the gears.

As can be seen particularly from FIG. 6, two epicyclic gear trains with the same number of planet gears 32 (the first and second sets S1, S2) are clocked (in degrees) corresponding to 360/(2n), where n is the total number planet gears 32 of the first and second sets S1, S2. The planet gears 32 of the first and second sets S1, S2 can be identical. The two epicyclic gear trains are in a stacked arrangement.

Figure 7:
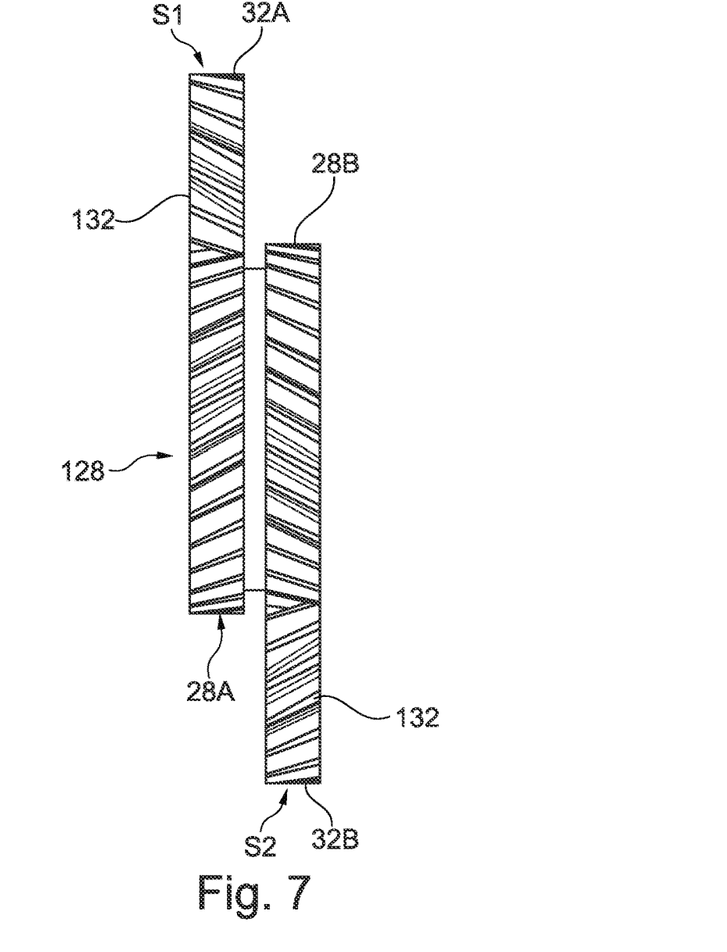
FIG. 7 is a side view of a sun gear and two planet gears for the gearbox of any of FIGS. 2 to 6.

According to FIG. 7, alternatively shaped sun and planet gears 128, 132 for the gearboxes 30, 130 are helical. A corresponding ring gear will be correspondingly helical. Therein, the sun gear 128 comprises a first ring of teeth 28A and a second ring of teeth 28B. The first ring of teeth 28A and the second ring of teeth 28B have opposite helicities. A gap is formed between the first and second rings of teeth 28A, 28B. Correspondingly, each of the planet gears 132 of the first set S1 has a ring of teeth 32A shaped to mesh with the first ring of teeth 28A of the sun gear 128. Each of the planet gears 132 of the second set S2 have a ring of teeth 32B shaped to mesh with the second ring of teeth 28B of the sun gear 128. The different helicities provide an axial fixture of the gears of the gearbox 30; 130.

It is worth noting that each planet gear 32 has only exactly one type of helicity (either left or right) and does not have different helicities.

Figure 8:
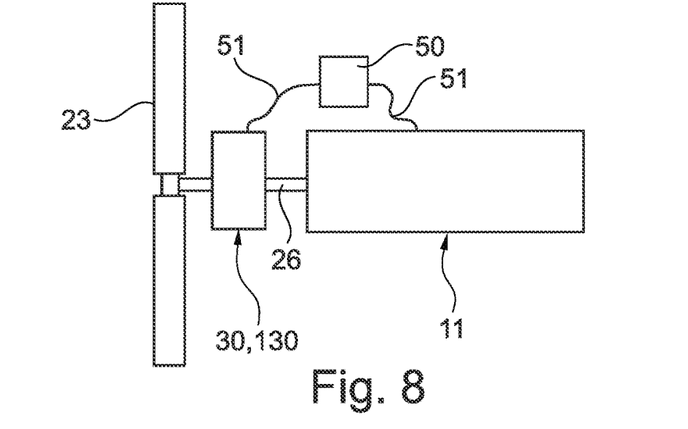
FIG. 8 is a schematic illustration of an arrangement of a core engine of the gas turbine engine of FIGS. 2 and 3 with a gearbox and a common oil system.

FIG. 8 shows various components of the gas turbine engine according to FIGS. 2 and 3. The engine core 11 is shown schematically and coupled to the gearbox 30; 130, which is a gearbox according to any embodiment described herein, via the shaft 26. The output of the gearbox 30; 130 drives the fan 23.

Furthermore, FIG. 8 shows an oil system 50. The oil system 50 circulates oil via ducts 51 to the engine core 11 as well as to the gearbox 30; 130. That is, the oil system 50 is one common oil system 50 that is adapted to lubricate both the gearbox 30; 130 and the engine core 11. This allows a simplification of the gas turbine engine 10 and a reduction of weight.

Figure 9:
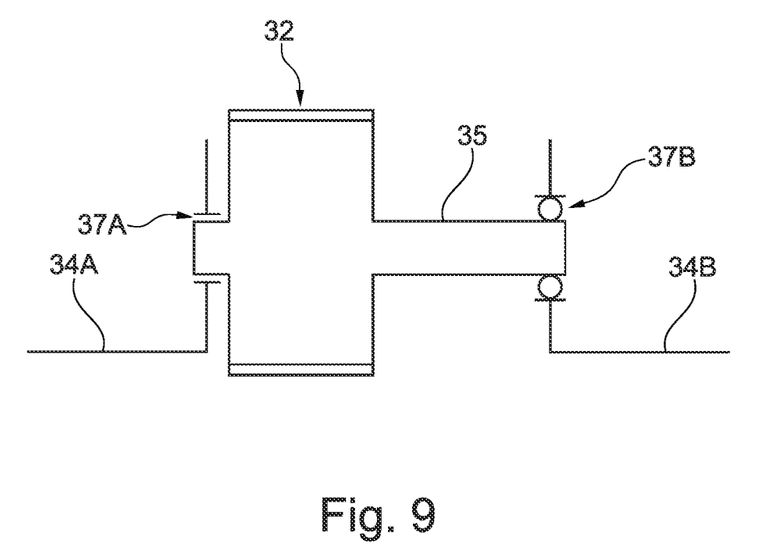
FIG. 9 is a side view of a planet gear mounted on a planet carrier.

FIG. 9 shows an example how one or more of the planet gears 32 (e.g. all planet gears 32 of one set S1, S2, or all planet gears 32 of all sets S1, S2) can be rotatably mounted on the planet carrier 34. In this example, the shown planet gear 32 is fixed to the pin 35. The pin 35 (or planet shaft) is rotatably mounted on the planet carrier 34. Therein, the pin 35 is rotatably mounted on one portion 34A of the planet carrier 34 by means of a journal bearing 37A (or, alternatively, by means of a rolling element bearing), in the present example on the first portion 34A facing the fan 23. Further, the pin 35 is rotatably mounted on the other portion 34B of the planet carrier 34 by means of a roller bearing 37B (or rolling element bearing), e.g. a ball bearing (or, alternatively, by means of a journal bearing), in the present example on the second portion 34B facing the engine core 11. It has been found that this configuration allows a particularly robust gearbox 30; 130. However, for a simplified design, it would also be possible to only use journal bearings 37A or only use roller bearings 37B on both sides. Each of the gearboxes 30; 130 described herein may optionally use these kinds of planet gear 32 bearing.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For example, the gearboxes 30, 130 described herein may comprise more than two sets (stages) of planet gears 32.

LIST OF REFERENCE NUMBERS 8 aircraft
9 principal rotational axis
10 gas turbine engine
11 engine core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary support structure
26 shaft (first core shaft)
27 interconnecting shaft (second core shaft)
28; 128 sun gear
28A first ring of teeth
28B second ring of teeth
30; 130 gearbox
32; 132 planet gear
32A (first) ring of teeth
32B (second) ring of teeth
34 planet carrier
34A first portion
34B second portion
35 pin
36 linkages (output)
37A journal bearing
37B roller bearing
38; 138 ring gear
38A first ring of teeth
38B second ring of teeth
40 linkages
50 oil system
51 oil duct
A core airflow
B bypass airflow
R rotational axis
S1 first set of planet gears
S2 second set of planet gears

The invention claimed is:

1. A gas turbine engine for an aircraft, comprising:
an engine core comprising a turbine, a compressor, and a core shaft connecting the turbine to the compressor;
a fan comprising a plurality of fan blades; and
a gearbox that receives an input from the core shaft and outputs drive to the fan to drive the fan about a rotational axis at a lower rotational speed than the core shaft, wherein the gearbox is an epicyclic gearbox with a plurality of planet gears arranged in at least first and second sets of planet gears, the planet gears of the first set being positioned displaced relative to the planet gears of the second set in a direction 1) parallel to the rotational axis and also 2) circumferentially around the rotational axis.

2. The gas turbine engine according to claim 1, wherein the planet gears of the first set are arranged to rotate in a first plane and the planet gears of the second set are arranged to rotate in a second plane, the first plane being parallel to the second plane and displaced relative to the second plane in the direction parallel to the rotational axis.

3. The gas turbine engine according to claim 1, wherein outer radial portions of the planet gears of the first and second sets overlap one another in a circumferential direction but inner radial portions of the planet gears of the first and second sets do not overlap one another in the circumferential direction.

4. The gas turbine engine according to claim 1, wherein the planet gears of the first set are axially offset relative to the planet gears of the second set, so that side faces of the planet gears of the first set face side faces of the planet gears of the second set.

5. The gas turbine engine according to claim 1, and further comprising a plurality of pins, wherein each of the planet gears is mounted on one of the pins, wherein pins of one of the first and second sets extend between adjacent pins of the other one of the first and second sets.

6. The gas turbine engine according to claim 1, wherein the core shaft is arranged to rotate coaxially with the rotational axis.

7. The gas turbine engine according to claim 1, and further comprising a planet carrier carrying the planet gears of the first and second sets.

8. The gas turbine engine according to claim 7, wherein the planet carrier comprises a first portion and a second portion, wherein the planet gears of the first and second sets are arranged between the first and second portions.

9. The gas turbine engine according to claim 7, wherein the fan is fixedly connected to the planet carrier via one or more linkages.

10. The gas turbine engine according to claim 9, wherein the core shaft is arranged to simultaneously rotate in a same rotational direction as the one or more linkages.

11. The gas turbine engine according to claim 5, wherein one or more of the planet gears are rotatably mounted on the respective pins, the pins being fixed to the planet carrier, and/or one or more of the planet gears are fixed to the respective pins, the pins being rotatably mounted on the planet carrier.

12. The gas turbine engine according to claim 1, wherein each of the planet gears of the first set comprises a first ring of teeth and each of the planet gears of the second set comprises a second ring of teeth, the first ring of teeth having an opposite helicity than the second ring of teeth.

13. The gas turbine engine according to claim 1, wherein the first set comprises a same quantity of planet gears as the second set.

14. The gas turbine engine according to claim 1, wherein the first set and/or the second set comprises at least three of the planet gears.

15. The gas turbine engine according to claim 1, and further comprising a common oil system that provides oil both to the engine core and to the gearbox.

16. The gas turbine engine according to claim 1, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

17. The gas turbine engine according to claim 1, wherein the first set and/or the second set comprises four of the planet gears.

18. A gas turbine engine for an aircraft, comprising:
an engine core comprising a turbine, a compressor, and a core shaft connecting the turbine to the compressor;
a fan comprising a plurality of fan blades; and
a gearbox that receives an input from the core shaft and outputs drive to the fan to drive the fan about a rotational axis at a lower rotational speed than the core shaft, wherein the gearbox is an epicyclic gearbox with a plurality of planet gears arranged in at least first and second sets of planet gears, the planet gears of the first set being positioned displaced relative to the planet gears of the second set in a direction parallel to the rotational axis; and
wherein first pins of the planet gears of the first set are positioned displaced circumferentially around the rotational axis relative to second pins of the planet gears of the second set.

19. The gas turbine engine according to claim 18, wherein outer radial portions of the planet gears of the first and second sets overlap one another in a circumferential direction but inner radial portions of the planet gears of the first and second sets do not overlap one another in the circumferential direction.

\* \* \* \* \*